(12) United States Patent
Watson et al.

(10) Patent No.: US 9,308,693 B2
(45) Date of Patent: Apr. 12, 2016

(54) APPARATUS FOR VOID-FREE DEBULKING OF ADHESIVE BONDED JOINTS

(75) Inventors: Megan Nicole Watson, Kent, WA (US); Joseph L. Hafenrichter, Seattle, WA (US); Mary H. Vargas, Woodinville, WA (US); Michael W. Evens, Burien, WA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 13/557,269

(22) Filed: Jul. 25, 2012

(65) Prior Publication Data

US 2012/0298311 A1    Nov. 29, 2012

Related U.S. Application Data

(62) Division of application No. 12/953,532, filed on Nov. 24, 2010, now Pat. No. 8,262,841.

(51) Int. Cl.
| | |
|---|---|
| *B32B 37/10* | (2006.01) |
| *B29C 73/10* | (2006.01) |
| *B29C 73/12* | (2006.01) |
| *B29C 65/00* | (2006.01) |
| *F16B 11/00* | (2006.01) |
| *B29C 65/48* | (2006.01) |

(52) U.S. Cl.
CPC .................. *B29C 73/10* (2013.01); *B29C 73/12* (2013.01); *B29C 65/4835* (2013.01); *B29C 66/00145* (2013.01); *B29C 66/342* (2013.01); *B29C 66/45* (2013.01); *B29C 66/472* (2013.01); *B29C 66/721* (2013.01); *B29C 66/81455* (2013.01); *B29C 66/8221* (2013.01); *B29C 66/82661* (2013.01); *F16B 11/006* (2013.01)

(58) Field of Classification Search
CPC ..................... B29C 65/4835; B29C 66/00145; B29C 66/342; B29C 66/45; B29C 66/472; B29C 66/721; B29C 66/81455; B29C 66/82661; B29C 73/10; B29C 73/12
See application file for complete search history.

(56) References Cited

U.S. PATENT DOCUMENTS

| | | | |
|---|---|---|---|
| 4,357,193 A | 11/1982 | McGann et al. | |
| 5,116,216 A | 5/1992 | Cochran et al. | |
| 5,958,166 A | 9/1999 | Walters et al. | |
| 6,050,318 A * | 4/2000 | Roczynski et al. | 156/522 |
| 6,481,482 B1 * | 11/2002 | Shimotomai | 156/366 |

(Continued)

OTHER PUBLICATIONS da Silva et al., "Manufacture of adhesive joints and bulk specimens with high-temperature adhesives", Int'l J. Adhesion & Adhesives, 24 (2004), pp. 69-83.

(Continued)

*Primary Examiner* — Christopher Schatz
(74) *Attorney, Agent, or Firm* — Ostrager Chong Flaherty & Broitman P.C.

(57) ABSTRACT

Methods and apparatus for fabricating adhesive bonded joints while minimizing the voids and/or porosity found in the cured bondline. In accordance with various embodiments, the apparatus comprises an evacuation chamber combined with a pressure inducing device to produce bonded joints that are both void free and thoroughly compacted. The surfaces to be bonded are continuously evacuated throughout the bonding process (pre-mating, mating, debulking and cure). Continuous evacuation is provided via standard vacuum, while the induced pressure can be pneumatically or mechanically provided.

6 Claims, 13 Drawing Sheets

(56) References Cited

U.S. PATENT DOCUMENTS

2003/0188821 A1* 10/2003 Keller et al. .................... 156/94
2006/0032587 A1   2/2006 Hecht et al.
2009/0026645 A1*  1/2009 Tsuda et al. ................. 264/40.1

OTHER PUBLICATIONS

Davis, "Managing Micro-Voiding of Adhesive Bonds", Adhesion Associates, Dec. 2009.

* cited by examiner

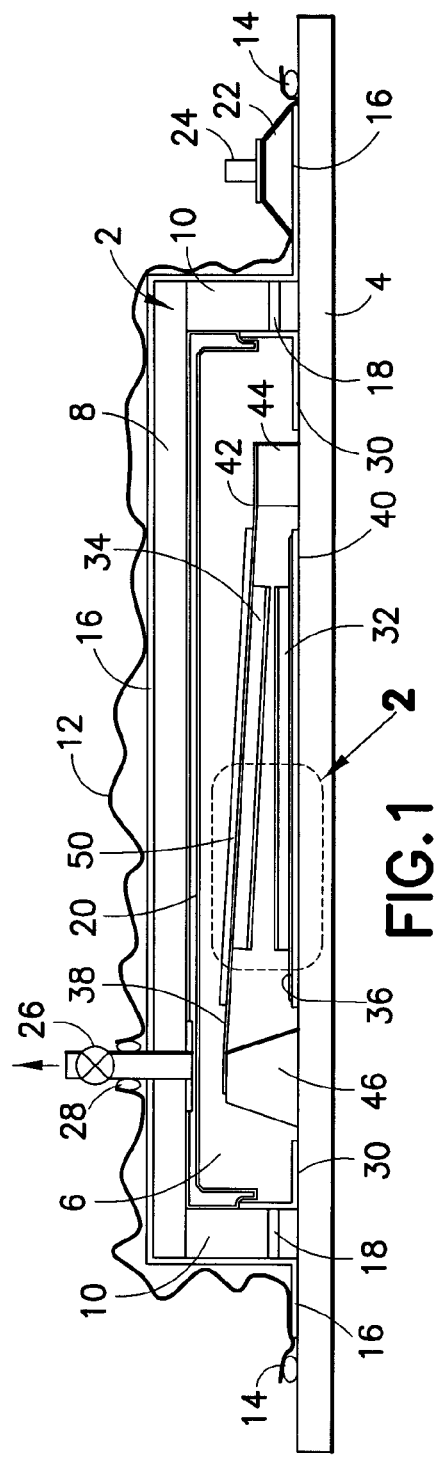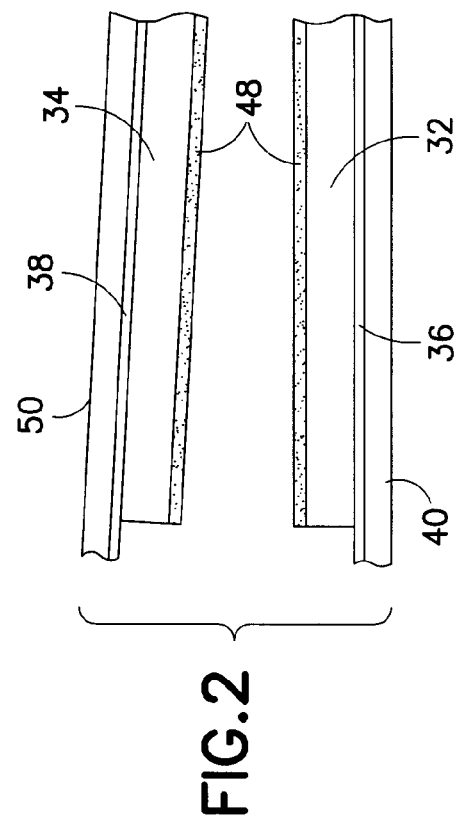

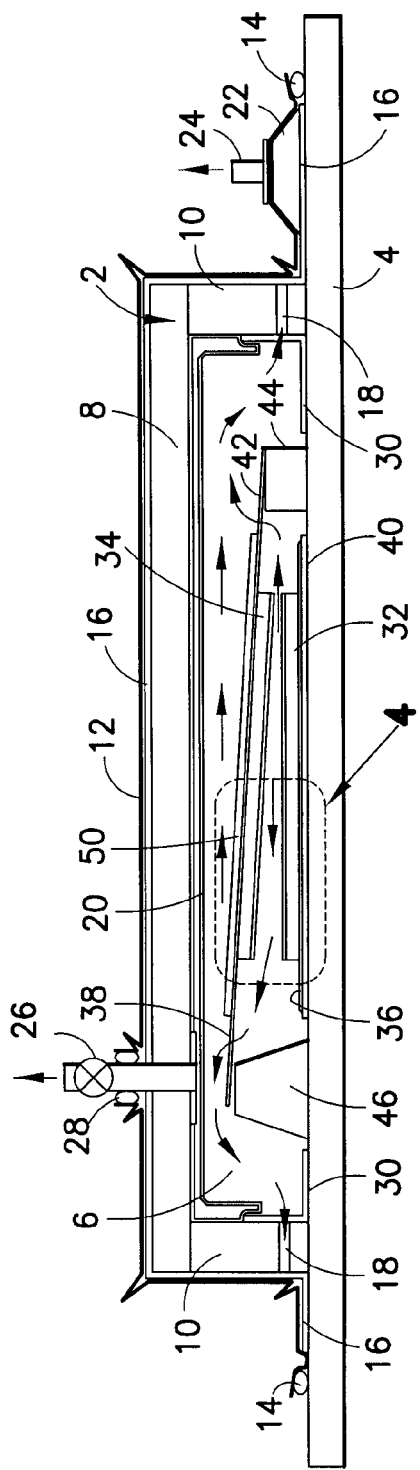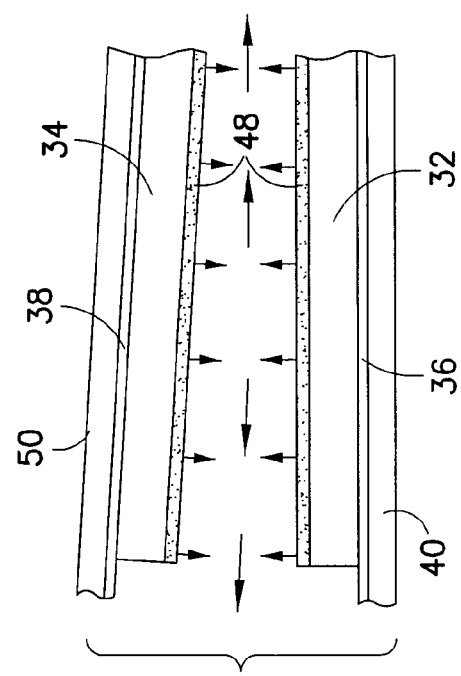

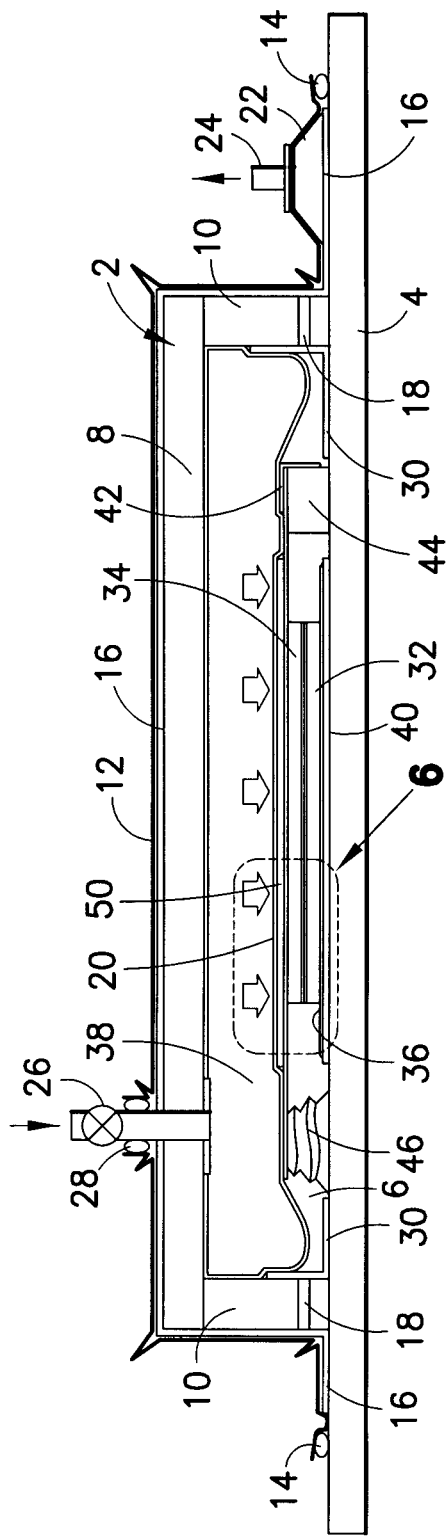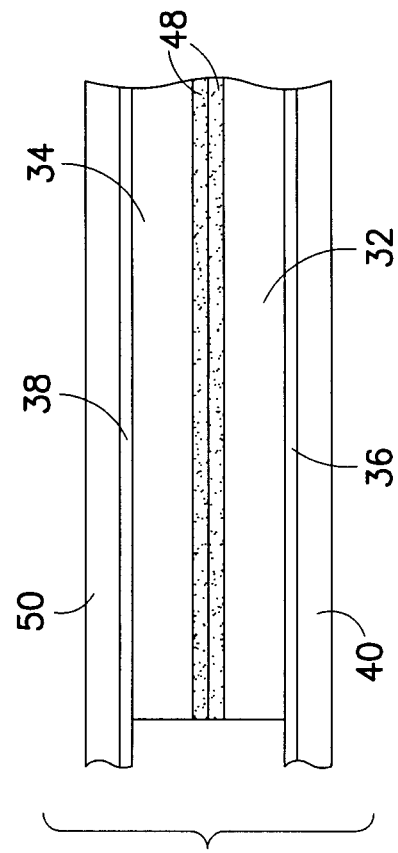

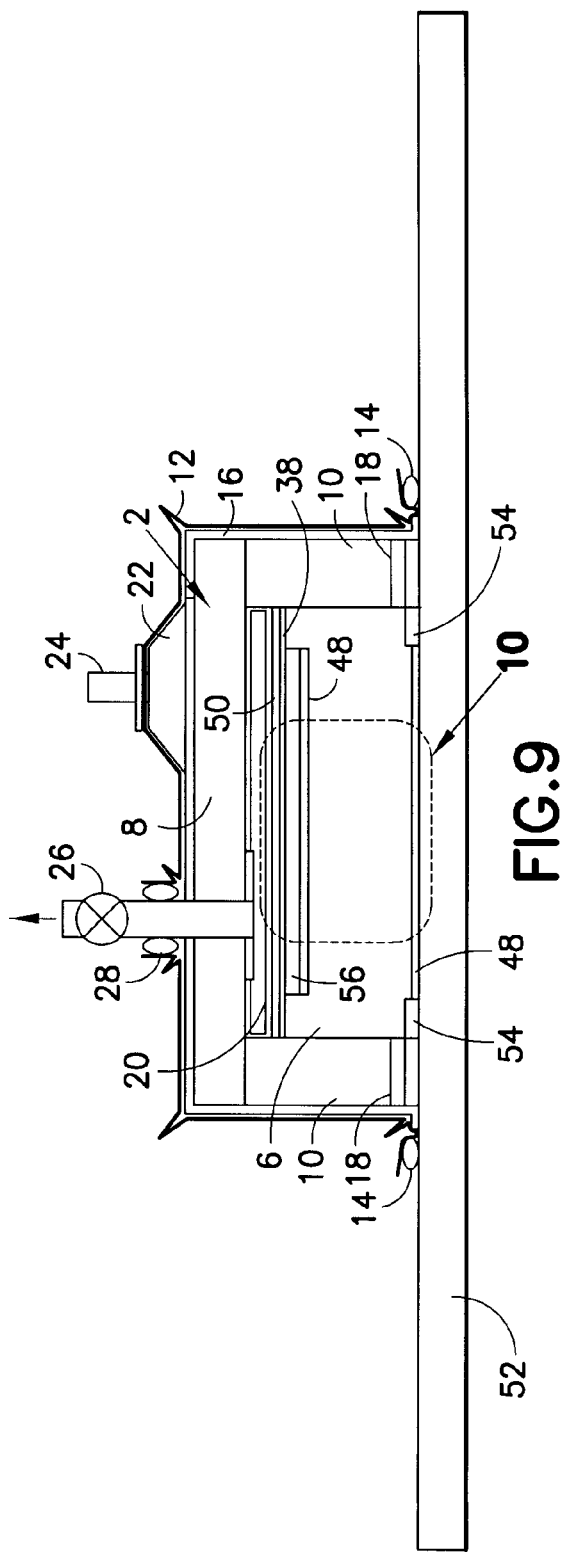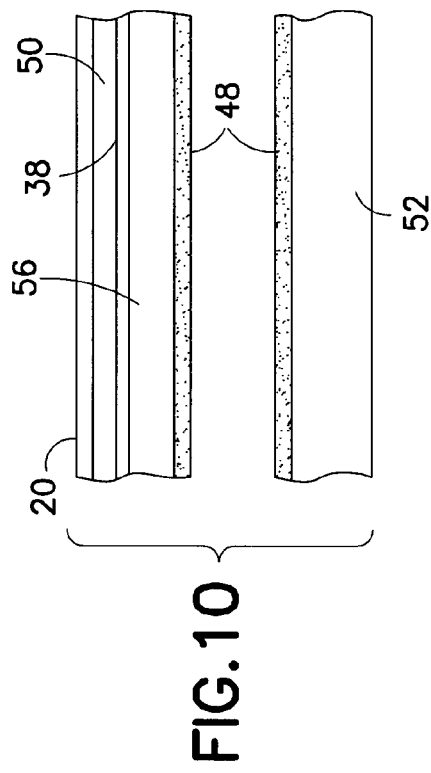

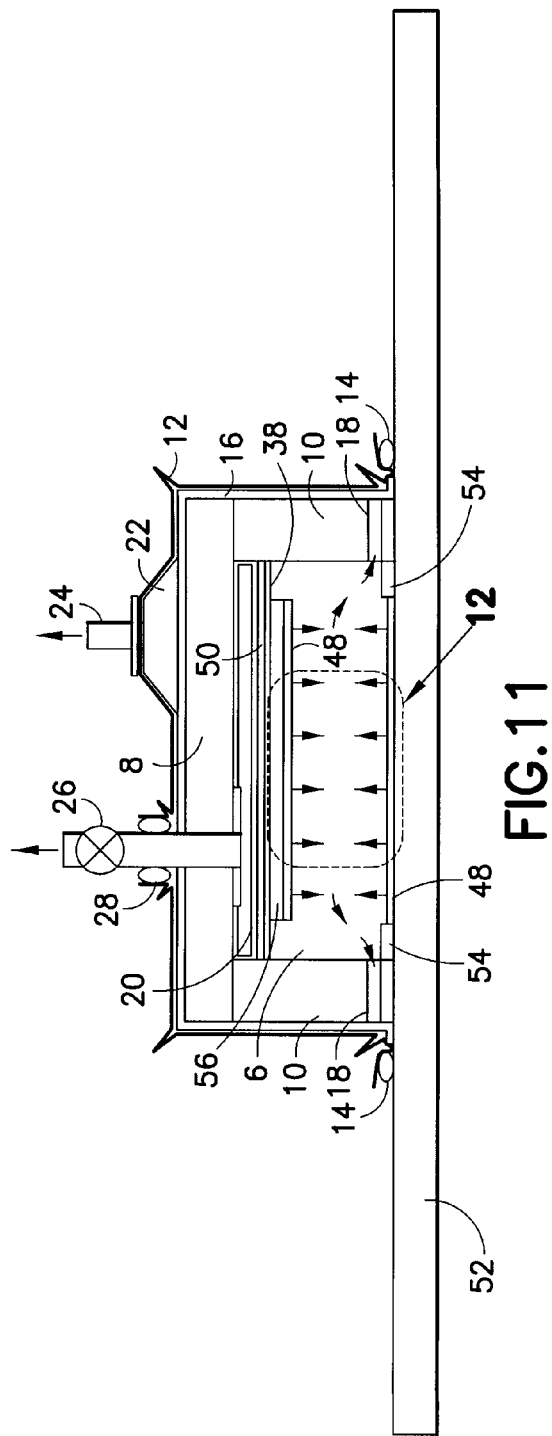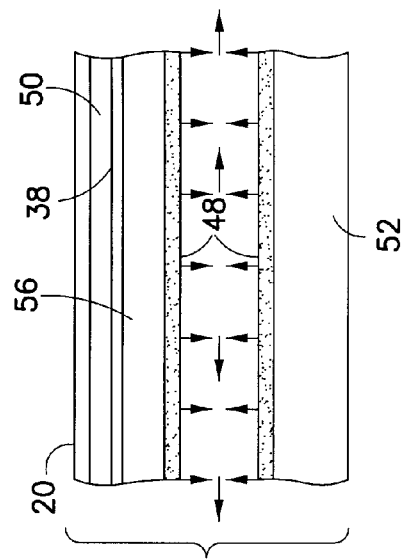

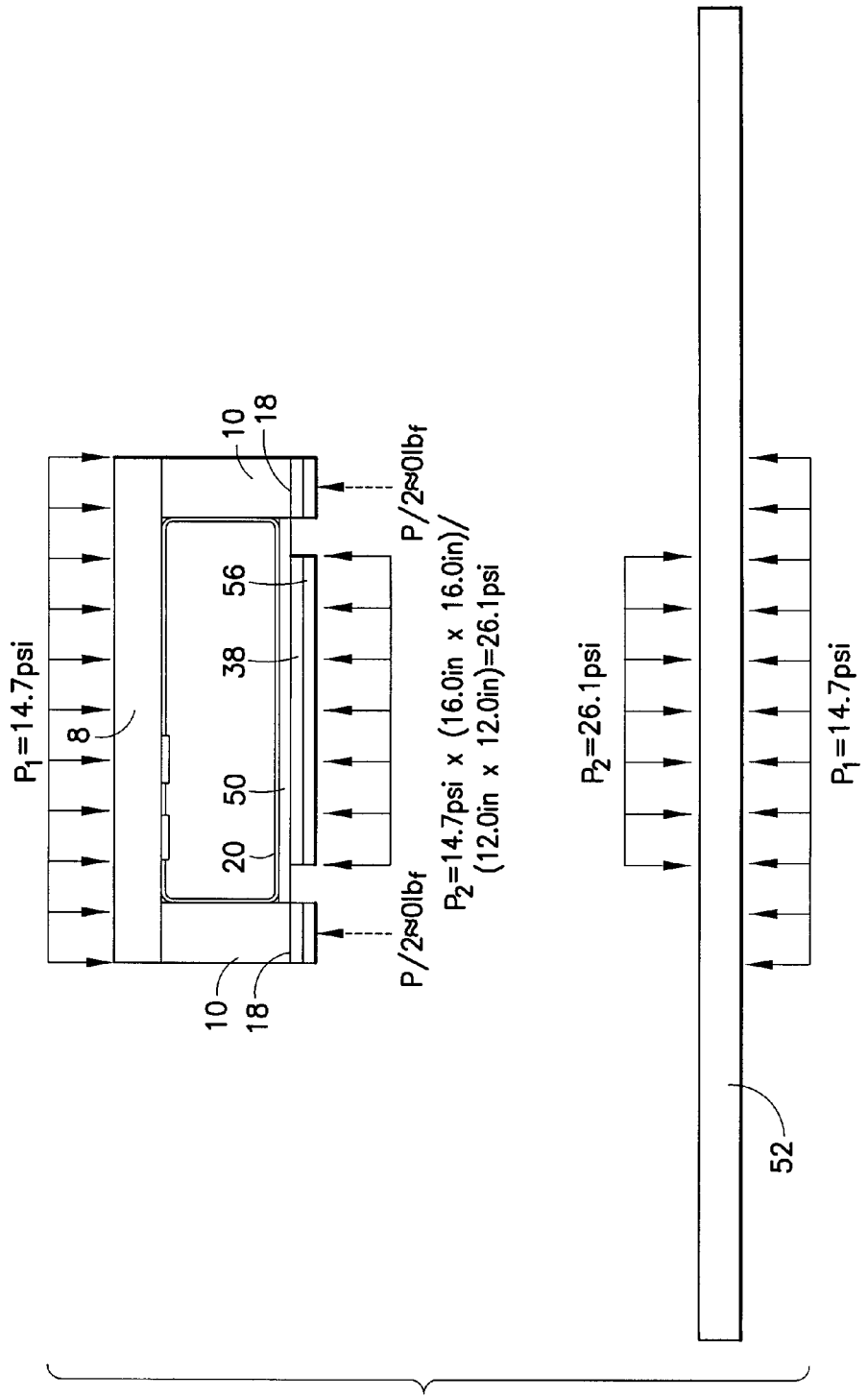

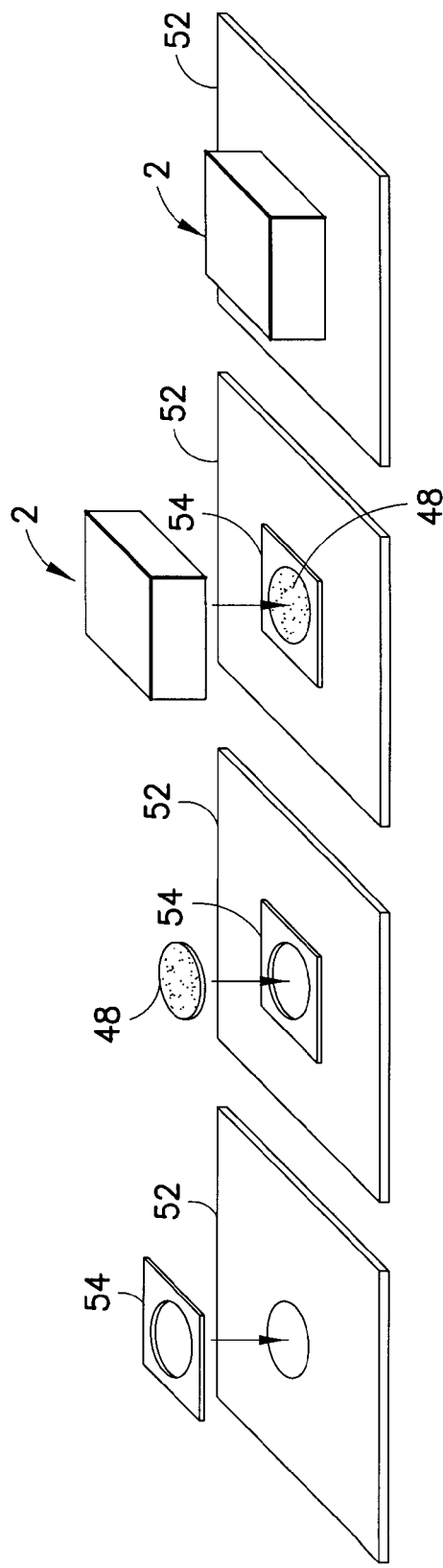

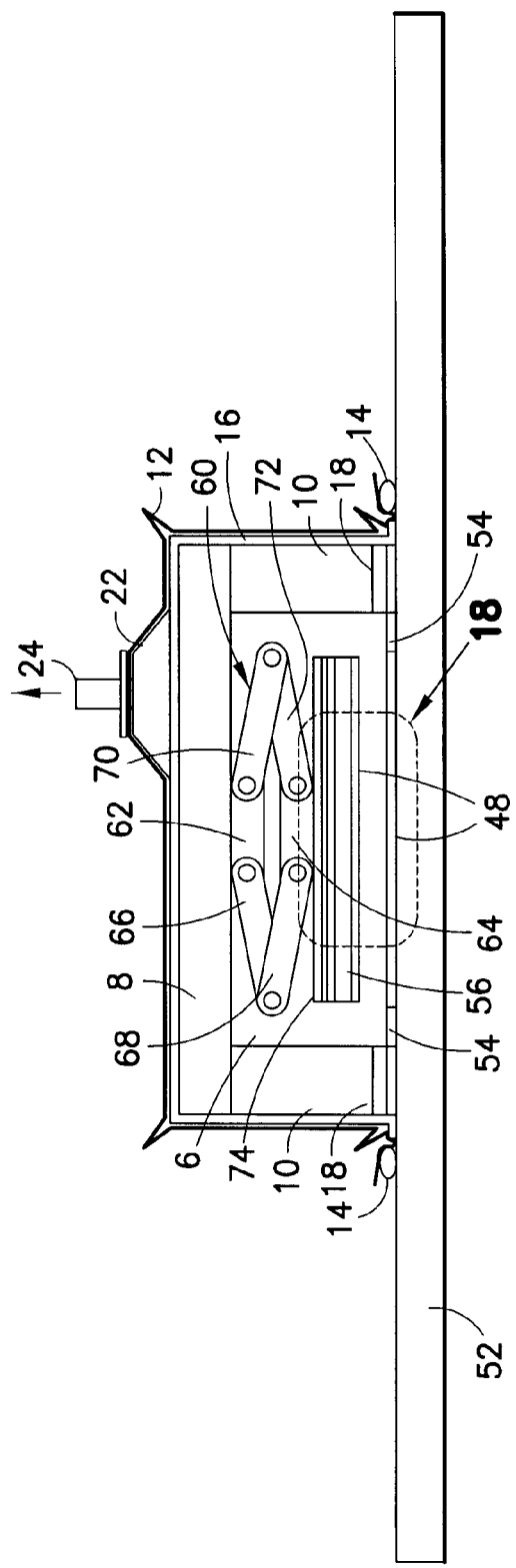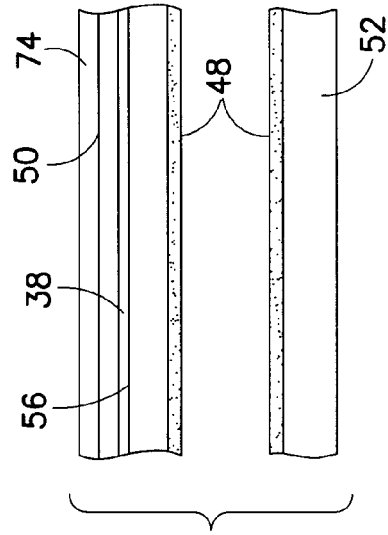

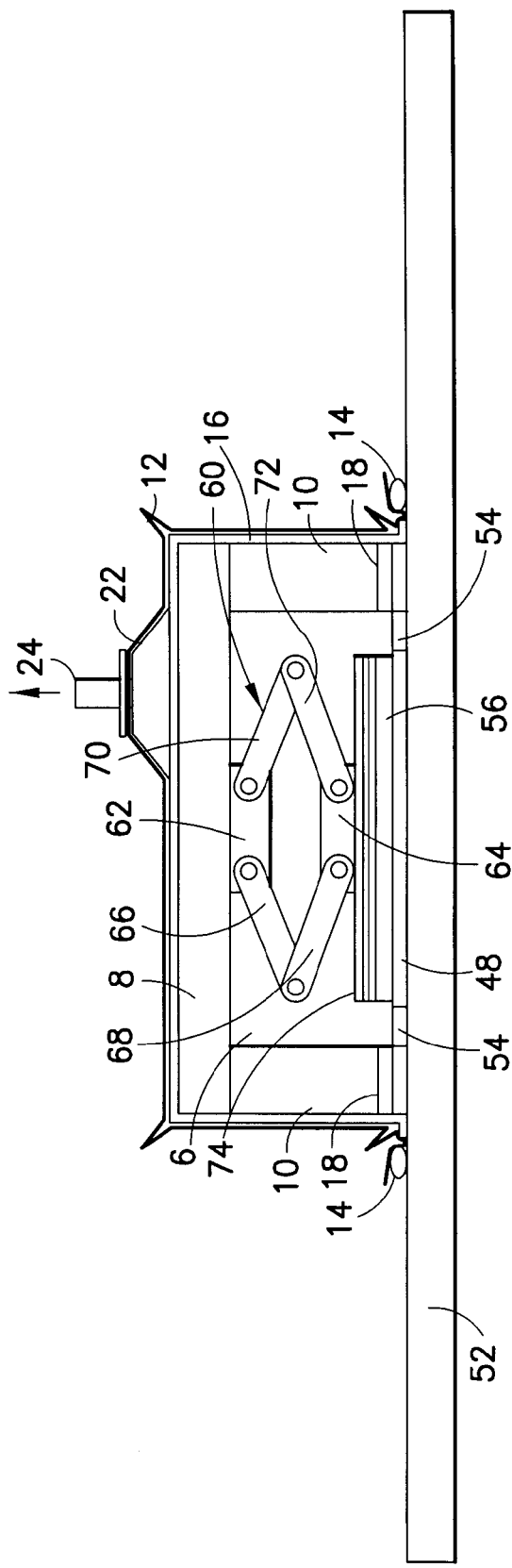
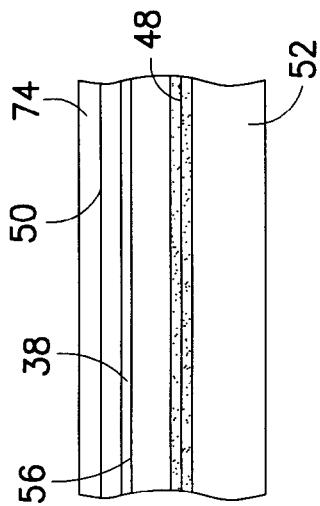

APPARATUS FOR VOID-FREE DEBULKING OF ADHESIVE BONDED JOINTS

RELATED PATENT APPLICATION

This application is a divisional of and claims priority from U.S. patent application Ser. No. 12/953,532 filed on Nov. 24, 2010.

BACKGROUND

This invention generally relates to systems and methods for minimizing the voids and/or porosity of bonded joints (e.g., bonded aircraft joints) fabricated using adhesives. As used herein, the term "adhesive" comprises resins, film adhesives and paste adhesives.

Known methods of fabricating bonded joints using paste adhesives leave voids and/or porosity in the bondline once the laminates are bonded together. These voids reduce the mechanical properties that, optimally, should be exhibited by the adhesive. This reduction in properties is especially true for paste adhesives with higher viscosities that tend to retain entrapped air more than less viscous adhesives.

It is known that the application of positive pressure in an autoclave can be used to reduce the size of voids by reducing their volume. In many cases autoclaves are not feasible for use, so vacuum bag processes are used. The resulting bonded repairs were either used as-is with porosity and/or voids, or they were reprocessed until acceptable joints were fabricated.

There is a need for a solution for eliminating or minimizing voids and porosity in the bondlines of paste adhesive, film adhesive or resin system coupons without the use of high-pressure autoclaves.

BRIEF SUMMARY

This invention encompasses methods and apparatus for fabricating adhesive bonded joints while minimizing the voids and/or porosity found in the cured bondline. In accordance with various embodiments, the apparatus comprises an evacuation chamber combined with a pressure inducing device to produce bonded joints that are both void free and thoroughly compacted. The surfaces to be bonded are continuously evacuated throughout the bonding process (pre-mating, mating, debulking and cure). Typical atmospheric vacuum and pneumatic pressures are all that are needed; unusual processes and expensive apparatus are not required.

Continuous evacuation is provided via standard vacuum, while the induced pressure can be pneumatically or mechanically provided. In one manifestation, the pressure inducing device operates in conjunction with a hinge mechanism that is supported by a collapsible block that is crushable under slight pressure. (The collapsible block can be a paper cup, deflectable balloon, mechanical device or electronic device.) Other manifestations utilize pneumatic or mechanical apparatus as pressure inducing devices. Potential applications for this invention include aircraft bonded structure, bonded test specimens or coupons, bonded precured patches, and/or bonded uncured patches. The processes disclosed herein can be applied to composite and metallic bonded joints.

Other aspects of the invention are disclosed and claimed below.

BRIEF DESCRIPTION OF THE DRAWINGS

FIG. 1 is a drawing showing a sectional view of apparatus for void-free debulking of adhesive applied to upper and lower components to be bonded in accordance with one embodiment of the invention. The apparatus is shown in a state wherein the external bag is semi-inflated while the pressure inducer is deflated.

FIG. 2 is a drawing showing a magnified view of the structure encompassed by the dashed closed contour labeled with boldface numeral 2 in FIG. 1.

FIG. 3 is a drawing showing a sectional view of the apparatus depicted in FIG. 1 in a state wherein the external bag is evacuated while the pressure inducer is deflated.

FIG. 4 is a drawing showing a magnified view of the structure encompassed by the dashed closed contour labeled with boldface numeral 4 in FIG. 3.

FIG. 5 is a drawing showing a sectional view of the apparatus depicted in FIGS. 1 and 3 in a state wherein the external bag is evacuated while the pressure inducer is inflated.

FIG. 6 is a drawing showing a magnified view of the structure encompassed by the dashed closed contour labeled with boldface numeral 6 in FIG. 5.

FIG. 9 is a drawing showing a sectional view of apparatus for void-free debulking of adhesive applied to an aircraft structure and to a repair patch to be bonded thereto in accordance with a further embodiment of the invention. The apparatus is shown in a state wherein the external bag is semi-inflated while the pressure inducer is deflated.

FIG. 10 is a drawing showing a magnified view of the structure encompassed by the dashed closed contour labeled with boldface numeral 10 in FIG. 9.

FIG. 11 is a drawing showing a sectional view of the apparatus depicted in FIG. 9 in a state wherein the external bag is evacuated while the pressure inducer is deflated.

FIG. 12 is a drawing showing a magnified view of the structure encompassed by the dashed closed contour labeled with boldface numeral 12 in FIG. 11.

FIG. 15 is a free body diagram showing the estimated forces exerted on exemplary apparatus parts and components to be bonded in the state depicted in FIG. 13.

FIGS. 16A-16D are diagrams showing the sequence of operations for locating a template and an evacuation chamber in accordance with the embodiment depicted in FIG. 9.

FIG. 17 is a drawing showing a sectional view of apparatus for void-free debulking of adhesive applied to an aircraft structure and to a repair patch to be bonded thereto in accordance with yet another embodiment of the invention. The apparatus is shown in a state wherein the external bag is evacuated while the pressure inducer is de-activated.

FIG. 18 is a drawing showing a magnified view of the structure encompassed by the dashed closed contour labeled with boldface numeral 18 in FIG. 17.

FIG. 19 is a drawing showing a sectional view of the apparatus depicted in FIG. 17 in a state wherein the external bag is evacuated while the pressure inducer is activated.

FIG. 20 is a drawing showing a magnified view of stack of components being pressed together by the pressure inducer as seen in FIG. 19.

Reference will hereinafter be made to the drawings in which similar elements in different drawings bear the same reference numerals.

DETAILED DESCRIPTION

Figure 7:
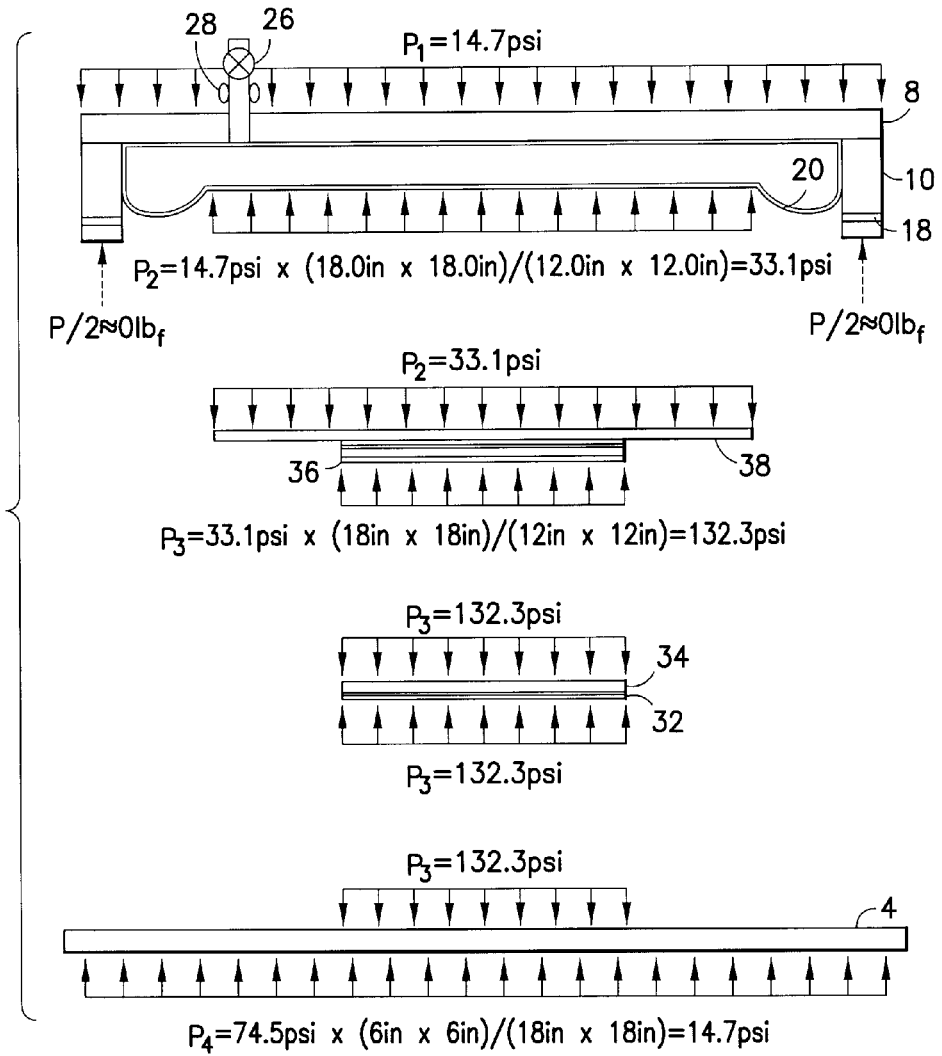
FIG. 7 is a free body diagram showing the estimated forces exerted on exemplary apparatus parts and components to be bonded in the state depicted in FIG. 5.

Various embodiments of the invention will now be described. In each embodiment, the apparatus used to carry out the debulking process comprises an evacuation chamber combined with a pressure inducing device to produce bonded joints that are both void free and thoroughly compacted. The surfaces to be bonded are continuously evacuated throughout the bonding process (pre-mating, mating, debulking and cure). Continuous evacuation is provided via standard vacuum, while pressure can be pneumatically or mechanically induced.

To begin the process, parent laminates should be fabricated from the material of choice. These laminates could be a metallic structure, carbon/epoxy system, fiberglass/epoxy system, polyimide, or bismalemide. Once these panels are fabricated, surface preparation must be completed to ensure a required bonding surface. If the process is utilized as an on-aircraft or on-part process, the removal of old damage or surfacers (e.g., paint or primer) should be completed prior to surface preparation. The surface preparation will include sanding the bonding surfaces with 150-grit sanding disc or as required by process specifications. This reactivates the bonding surface and removes oxidation from the surface that hinders the bonding process. The panels will be wiped clean with acetone or a solvent required per material specification until no residue is present. Once the panels or repair patch and parent structure are prepped and cleaned, the apparatus disclosed hereinafter is assembled.

In accordance with a first embodiment shown in FIG. 1, the debulking system comprises a frame 2 which is designed to sit on a base plate 4. The frame 2 comprises a strongback support tooling 8 supported along its perimeter by a solid silicone standoff or spacer 10 connected to and projecting downward from the perimeter of strongback support tooling 8. The strongback support tooling 8 is made of stiff material, such as a panel made of honeycomb composite material. If the base plate 4 is flat, then the strongback support tooling 8 is preferably flat. Alternatively, an inflatable outer bladder can be used in place of the solid spacer 10. Such an inflatable outer bladder is disclosed in U.S. patent application Ser. No. 12/894,691 filed on Sep. 30, 2010, the disclosure of which is incorporated by reference herein in its entirety.

An inflatable bladder 20 is removably attached (e.g., by hook-and-loop fasteners) to the interior surface of the strongback support tooling 8 and to the upper portions of the interior surface of spacer 10. The space bounded by base plate 4, bladder 20 and the lower portion of the interior surface of spacer 10 will be referred to herein as an evacuation chamber 6. It should be understood that the shape and volume of the evacuation chamber 6 will change as bladder 20 inflates or deflates.

In addition to the bladder inside the frame, a heavy breather cloth 16 overlies the frame 2 and extends beyond the footprint of frame 2 so that the outermost peripheral portion of the breather cloth 16 lies on the base plate 4. As used herein, the term "breather" means a porous material that serves as a continuous air path over or around the frame 2.

In turn, an external vacuum bag 12, made, e.g., of nylon vacuum bagging material, covers the breather material 16. The external vacuum bag 12 is sealed to the base plate 4 by sealing tape 14 which surrounds the breather material 16. In an unevacuated state, the external vacuum bag 12 fits loosely over the breather material 16, leaving open space therebetween. That open space external to frame 2 communicates freely with the evacuation chamber 6 via a plurality of throughholes 18 formed in spacer 10. Alternatively, if the interface between base plate 4 and spacer 10 is not airtight due to the presence of one or more gaps, throughholes need not be provided.

The embodiment shown in FIG. 1 further comprises a breather cloth 30 which is disposed inside the evacuation chamber 6. The breather cloth 30 is placed over a portion of base plate 4 and lower portions of the interior surface of spacer 10, the latter extending to an elevation higher than the elevation of throughholes 18. The breather cloth 30 helps to maintain the vacuum pressure inside evacuation chamber 6 when bladder 20 is inflated (see FIG. 5). Optionally, the breather cloth may also cover the upper/lower component assembly disposed inside the evacuation chamber 6. In accordance with a further alternative, a solid (i.e., not perforated) sheet of fluorinated ethylene propylene (FEP) film (not shown in FIG. 1) may be laid over the upper/lower component assembly to prevent the adhesive squeeze out from damaging the inner bladder 20 once it has been inflated (see FIG. 5). This solid FEP sheet will act as a barrier only.

The evacuation chamber 6 can be coupled to a vacuum source (not shown) by means of a vacuum probe 22 that passes through an opening in the external vacuum bag 12 and is connected to the vacuum source by a hose 24. Another vacuum probe (not shown in FIG. 1) is coupled to a vacuum gauge (also not shown), which measures the pressure inside the evacuation chamber 6.

In contrast, the bladder 20 can be selectively coupled to either a vacuum source (not shown) or to a source of pressurized air (not shown) via a valve 26. FIG. 1 shows the bladder 20 deflated (compare FIG. 5, wherein bladder 20 is inflated). The upwardly directed arrow above valve 26 in FIG. 1 indicates the direction of air flow during deflation of bladder 20, i.e., valve 26 is in a state wherein bladder 20 is coupled to the vacuum source. The valve 26 passes through respective openings in bladder 20, strongback support tool 8 and external vacuum bag 12. The portion of external vacuum bag 12 surrounding the opening for the pressurization hose which is coupled to valve 26 is sealed around the hose using sealing tape 28.

In the embodiment shown in FIG. 1, two components 32 and 34 to be adhesively bonded together are disposed inside the evacuation chamber 6. These components are shown on a magnified scale in FIG. 2. As seen in FIG. 2, each component has a layer of adhesive 48 applied on a bonding surface. Alternatively, adhesive could be applied to the bonding surface of the lower component 32 only or of the upper component 34 only. In a preferred embodiment, both components are made of fiber-reinforced plastic material.

Still referring to FIG. 2, lower component 32 is removably attached to a lower caul plate 36, while upper component 34 is removably attached to an upper caul plate 38. For example, components 32 and 34 could be attached to the respective caul plates using double-sided adhesive tape that can be peeled off easily upon completion of the bonding process. The lower caul plate 36 is removably attached to a lower heating blanket 40, which in turn is removably attached to base plate 4.

In the embodiment shown in FIGS. 1 and 2, an upper heating blanket 50 is removably attached to the upper surface of the upper caul plate 38. As seen in FIG. 1, the upper caul plate 38, with upper component 34 and upper heating blanket 50 attached thereto, is supported at one end by a collapsible block 46 and at the other end by a hinge block 44. Preferably, the collapsible block is made of a material that provides a known uniform rate of compressive collapse, thereby controlling the interface contact rate at the adhesive interface. Preferably, the other end of the upper caul plate 38 is pivotably mounted to hinge block 44 by means of a living hinge 42. The hinge block 44 is removably attached to the base plate 4. Alternatively, a separate hinge could be installed having one hinge part attached to the upper caul plate and the other hinge part attached to the hinge block. In accordance with a further alternative, the upper caul plate and hinge block could be coupled by temporary quick-release fastener means, such as a hook-and-loop fastener or opposing layers of cohesive material.

In accordance with a further alternative embodiment, caul plate extenders could be attached using double-sided adhesive tape to the upper surface of the upper caul plate 38, the ends of these caul plate extenders in turn being taped to the base plate 4 (using double-sided adhesive tape), thereby eliminating the need for hinge block 44 shown in FIG. 1. In accordance with this further alternative embodiment, the use of double-sided adhesive tape provides a pivot capability that allows the upper caul plate to swing downwardly relative to the base plate when the collapsible block 46 collapses. An additional caul plate extender could be removably attached to the upper surface of the upper caul plate such that the extender extends beyond the edge of the upper caul plate. The portion of this additional extender which extends beyond the upper caul plate edge can then be placed on top of the collapsible block 46, so that the upper caul plate itself need not extend all the way to the collapsible block.

As seen in FIG. 1, the leftmost portion of upper caul plate 38 is supported by a collapsible block 46. The height of collapsible block 46 is greater than the height of hinge block 44, so that the upper caul plate 38 will be disposed at an angle with respect to the lower caul plate 36. The blocks 44 and 46 also support upper caul plate 38 in a position such that there is a gap separating the layers of adhesive 48 (see FIG. 2) applied on respective surfaces of the components to be bonded. The collapsible block 46 allows the upper component 34 to mate with the lower component 32 when additive pressure is present (described in detail below). As previously described, the collapsible block preferably provides a known uniform rate of compressive collapse, such as a block of sponge material. Alternatively, the collapsible block may comprise a compression spring.

FIG. 1 shows the apparatus upon completion of the initial set-up. FIGS. 3 and 4 show the same apparatus as air is being removed from the evacuation chamber 6. Air is removed by pulling a vacuum pressure of 14.7 psi on the outer bag 12. As previously explained, the vacuum source is coupled to the evacuation chamber 6 via hose 24, vacuum probe 22, breather material 16 and throughholes 18. The vacuum pressure inside chamber 6 causes entrapped air and volatiles to be removed from the adhesive 48 and the space between the two bonding surfaces. The flow of air and volatiles during evacuation is indicated by arrows in FIG. 3. The goal is to minimize the amount of air and volatiles entrapped in the bondline after the adhesive has been cured. If the entrapped air and volatiles are not completely evacuated from the bondline surfaces, porosity and voids will be present in the bondline after curing of the adhesive. FIG. 4 is a magnified view of a portion of FIG. 3, showing entrapped air and volatiles leaving the adhesive 48 and flowing out of the space separating the lower and upper components 32 and 34.

In accordance with one preferred embodiment, the vacuum pressure stays constant at 14.7 psi throughout the entire process. This vacuum pressure is applied while the upper and lower components are separated as seen in FIG. 4 for a period of time sufficient to remove air and volatiles from the adhesive. When the desired degree of air/volatiles removal has been achieved, an additive pressure (preferably at least 5 psi) is induced by inflating bladder 20 (i.e., by releasing the retraction vacuum), as shown in FIG. 5. During this operation, the vacuum pressure inside chamber 6 is maintained.

As bladder 20 inflates, it presses against the portion of upper caul plate 38 which is seated atop the collapsible block 46, thereby applying a downward pressure on the latter to cause its collapse. The collapsible block 46 could be a paper cup, compression spring, deflatable ball, sponge, or any other object that will crush under pressure greater than 5 psi. As the collapsible block 46 collapses, the upper component 34 pivots downward about hinge 42 until it mates with the lower component 32. As bladder 20 continues to apply pressure, the adhesive 48 applied on the respective bonding surfaces of components 32 and 34 is pressed together for bondline cure as shown in FIG. 6, which is a magnified view of a portion of FIG. 5.

After the upper and lower components are pressed together with adhesive therebetween, the adhesive is ready for cure. The cure cycle can be done at room temperature or at some elevated temperature, depending on the requirements of the adhesive system. In accordance with the embodiment depicted in FIGS. 1-6, heating blankets 40 and 50 are used to raise the temperature of adhesive 48 to a level higher than room temperature. For adhesives that can be cured at room temperature, heating blankets would not be needed.

In cases where the adhesive is cured at an elevated temperature, a temperature controller (not shown in FIGS. 1-6) is connected to the heat blankets 40 and 50 and to a plurality of strategically placed thermocouples (not shown). In a well-known manner, the temperature controller can be programmed to control the electrical power being supplied to the electric heat blankets as a function of the temperatures detected by the thermocouples in accordance with a desired temperature cycle.

FIG. 7 is a free body diagram showing the estimated forces exerted on apparatus parts and components to be bonded in the state depicted in FIGS. 5 and 6 for the exemplary case wherein the strongback support tooling 8 is a square 18 inches on each side; upper caul plate 38 is a square 12 inches on each side; and the upper and lower components are squares 6 inches on each side. In this example, the resulting estimated compaction pressure $P_3 = 132.3$ psi.

Figure 8:
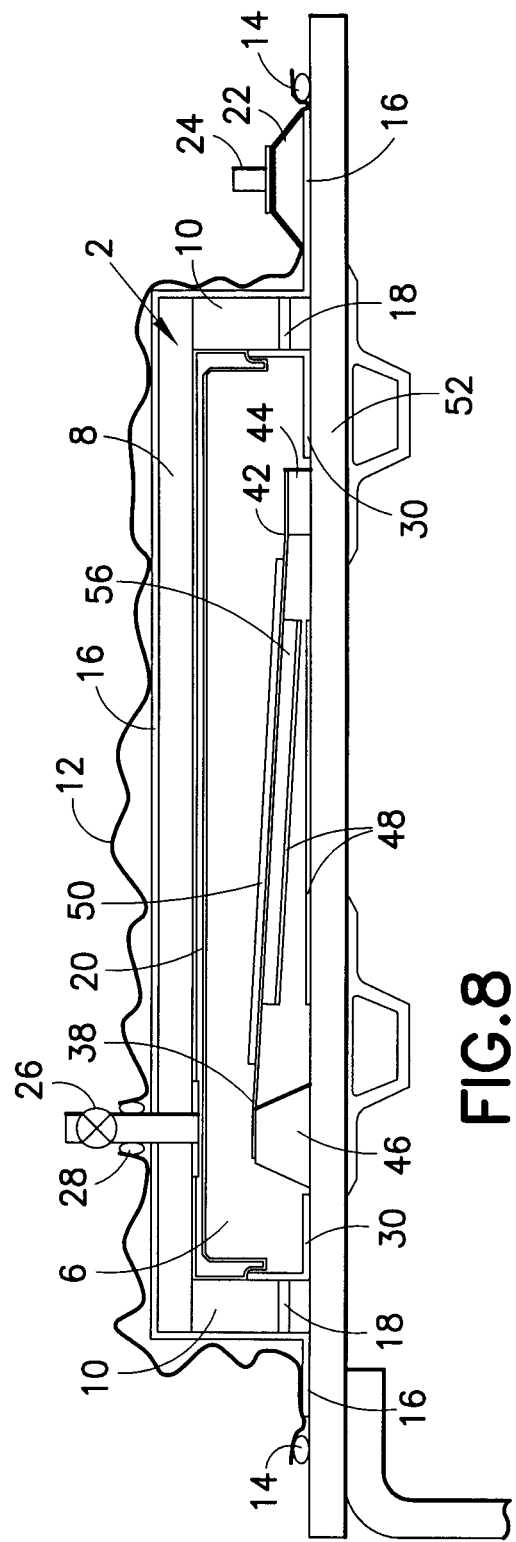
FIG. 8 is a drawing showing a sectional view of apparatus for void-free debulking of adhesive applied to an aircraft structure and to a repair patch to be bonded thereto in accordance with another embodiment of the invention. The apparatus is shown in a state wherein the external bag is semi-inflated while the pressure inducer is deflated.

In accordance with another embodiment (the initial set-up for which is shown in FIG. 8), a similar apparatus can be used to bond a composite (i.e., fiber-reinforced plastic) repair patch 56 to a portion of a parent structure (e.g., an aircraft structure) 52 that requires repair. The parent structure 52 may be made of fiber-reinforced plastic or metallic material. Preferably, the strongback support tooling 8 is contoured to generally match the contour of the parent structure 52 in the area of the repair.

In accordance with the embodiment shown in FIG. 8, the area on the parent structure which requires repair must first undergo the appropriate surface preparation. The prepared surface of the repair area on parent structure 52 is then covered with adhesive 48. Likewise the bonding surface of the repair patch 56 is covered with adhesive 48. The repair patch 56 is removably attached to one side of an upper caul plate 38. A heating blanket 50 is removably attached to the other side of upper caul plate 38. During set-up, the upper caul plate 38 (with attachments) is placed with one side supported by hinge block 44 (via hinge 42) and the other side supported by collapsible block 46 having a height greater than the height of the hinge block. The heights of the hinge block and collapsible block are selected so that the upper caul plate 38 is disposed at an angle relative to the parent structure 52 and the adhesive 48 on the surface of repair patch 56 is separated by a gap from the adhesive 48 applied on the repair area of the parent structure 52. Then the evacuation chamber frame 2 (with attachments) is placed as seen in FIG. 8. The breather material 16 is then placed as seen in FIG. 8. Finally, the external vacuum bag 12 is placed over the breather material 16 and sealed to the parent structure 52 by sealing tape 14. Other structural elements shown in FIG. 8 are indicated by the same reference numerals (e.g., 8, 10, 18, 22, 24, 26, 28 and 30) used for corresponding structural elements previously described with reference to FIG. 1.

To bond the repair patch 56 to the parent structure 52, the same process steps, as previously described, are performed in sequence, namely: (1) chamber 6 is evacuated, the vacuum pressure being maintained for a time sufficient to extract air and volatiles from the uncured adhesive; (2) after air and volatiles have been removed from the adhesive and while the vacuum pressure in chamber 6 is still being maintained, bladder 20 is inflated, first causing collapsible block 46 to collapse and then causing repair patch 56 to be pressed against the parent structure 52 with adhesive 48 therebetween; and (3) while the vacuum pressure in chamber 6 and the additive pressure of inflated bladder 20 are maintained, heating blanket 50 is activated to heat adhesive 48 to its cure temperature. Following these steps, all of the equipment (excluding repair patch 56) is removed, leaving the repair patch 56 adhesively bonded to the parent structure 52. The surface of the repair area with repair patch can then be finished according to required specifications.

FIG. 9 is a sectional view of apparatus for void-free debulking of adhesive 48 applied to a parent structure 52 (e.g., an aircraft structure) and to a repair patch 56 to be bonded thereto in accordance with a further embodiment of the invention. In a preferred embodiment, both the repair patch and parent structure are made of fiber-reinforced plastic material. In FIG. 9, the apparatus is shown in a state wherein the external bag 12 is semi-inflated while the pressure inducer 20 is deflated. FIG. 10 shows a magnified view of the structure encompassed by the dashed closed contour labeled with boldface numeral 10 in FIG. 9.

In accordance with the embodiment depicted in FIGS. 9 and 10, the area on the parent structure 52 which requires repair must first undergo the appropriate surface preparation. A component alignment template 54 is then placed on the top surface of the parent structure 52, surrounding the repair area (the shape of component alignment template 54 is shown in FIG. 16B). Still referring to FIGS. 9 and 10, the prepared surface of the repair area on parent structure 52 is then covered with adhesive 48.

An evacuation chamber frame with attachments is then placed over the repair area (now covered by adhesive). The frame comprises a strongback support tooling 8 supported along its perimeter by a solid silicone standoff or spacer 10 connected to and projecting downward from the perimeter of strongback support tooling 8. The spacer 10 has a plurality of throughholes 18. The strongback support tooling 8 has a throughhole in which a valve 26 is installed.

The shape of the inner periphery of spacer 10 is designed to match the outer periphery of the component alignment template 54, which will be described in more detail later with reference to FIGS. 16A-16D. The evacuation chamber frame is in proper position when it is placed on the parent structure 52 in a position where component alignment template 54 fits within the inner periphery of spacer 10.

The evacuation chamber frame has various attachments. An inflatable bladder 20 is removably attached (e.g., by hook-and-loop fasteners) to the interior surface of the strongback support tooling 8. The interior volume of the bladder 20 is in fluid communication with the valve 26. The space bounded by parent structure 52, bladder 20 and the lower portion of the interior surface of spacer 10 forms an evacuation chamber 6. As previously explained, the shape and volume of the evacuation chamber 6 will change as bladder 20 inflates or deflates.

The bladder 20 supports a stack of components (see items 50, 38 and 56 in FIG. 10). An upper heating blanket 50 is removably attached (e.g., using double-sided adhesive tape) to the external surface of bladder 20; an upper caul plate 38 is removably attached (e.g., using double-sided adhesive tape) to the lower surface of upper heating blanket 50; and the repair patch 56 is removably attached (e.g., using double-sided adhesive tape) to the lower surface of upper caul plate 38. The bonding surface of the repair patch 56 is covered with adhesive 48.

After the evacuation chamber frame has been placed on top of the parent structure 52, the frame is covered with a heavy breather cloth 16. The breather cloth 16 overlies the external surface of strongback support tool 8 and the external surface of spacer 10. Most importantly, the breather cloth 16 must overlie the throughholes 18 in spacer 10.

The breather material 16 is then covered with an external vacuum bag 12, made, e.g., of nylon vacuum bagging material. The external vacuum bag 12 is sealed to the parent structure 52 by sealing tape 14 which surrounds the evacuation chamber frame. The external vacuum bag 12 has an opening in which a vacuum probe 22 is installed. The vacuum probe 22 is connected to a vacuum source by a hose 24. The evacuation chamber 6 can be coupled to the vacuum source via hose 24, probe 22, breather cloth 16, and throughholes 18. Another vacuum probe (not shown in FIG. 9) can be coupled to a vacuum gauge (also not shown), which measures the pressure inside the evacuation chamber 6. The portion of external vacuum bag 12 surrounding the opening for the pressurization hose which is coupled to valve 26 is sealed around the hose using sealing tape 28. In an unevacuated state, the external vacuum bag 12 fits loosely over the breather material 16, leaving open space therebetween. FIG. 9 shows the external vacuum bag 12 when the chamber 6 is evacuated.

Still referring to FIG. 9, the bladder 20 can be selectively coupled to either a vacuum source (not shown) or to a source of pressurized air (not shown) via valve 26. FIG. 9 shows the bladder 20 deflated (compare FIG. 13, wherein bladder 20 is inflated). The upwardly directed arrow above valve 26 in FIG. 9 indicates the direction of air flow during deflation of bladder 20, i.e., valve 26 is in a state wherein bladder 20 is coupled to the vacuum source.

In the embodiment shown in FIG. 9, a repair patch 56 to be adhesively bonded to the parent structure 52 is disposed inside the evacuation chamber 6. These components are shown on a magnified scale in FIG. 10. As seen in FIG. 10, respective layers of adhesive 48 are applied to confronting surfaces of parent structure 52 and repair patch 56. Alternatively, adhesive could be applied to parent structure 52 only or to repair patch 56 only.

FIG. 9 shows the apparatus upon completion of the initial set-up. FIGS. 11 and 12 show the same apparatus as air is being removed from the evacuation chamber 6. Air is removed by pulling a vacuum pressure of 14.7 psi on the outer bag 12. The vacuum pressure inside chamber 6 causes entrapped air and volatiles to be removed from the adhesive 48 and the space between parent structure 52 and repair patch 56. The flow of air and volatiles during evacuation is indicated by arrows in FIG. 11. FIG. 12 is a magnified view of a portion of FIG. 11, showing entrapped air and volatiles leaving the adhesive 48 and flowing out of the space separating parent structure 52 and repair patch 56.

Figure 13:
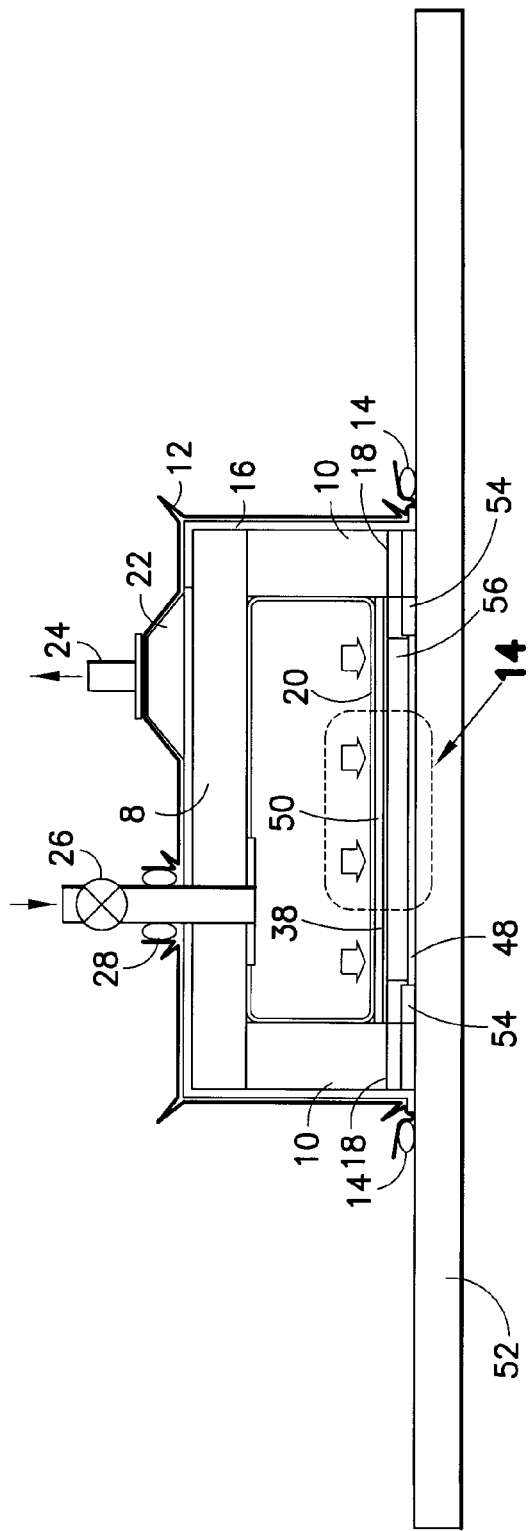
FIG. 13 is a drawing showing a sectional view of the apparatus depicted in FIGS. 9 and 11 in a state wherein the external bag is evacuated while the pressure inducer is inflated.

In accordance with one preferred embodiment, the vacuum pressure stays constant at 14.7 psi throughout the entire process. This vacuum pressure is applied while parent structure 52 and repair patch 56 are separated as seen in FIG. 12 for a period of time sufficient to remove air and volatiles from the adhesive. When the desired degree of air/volatiles removal has been achieved, an additive pressure (preferably at least 5 psi) is induced by inflating bladder 20 (i.e., by releasing the retraction vacuum), as shown in FIG. 13. During this operation, the vacuum pressure inside chamber 6 is maintained.

Figure 14:
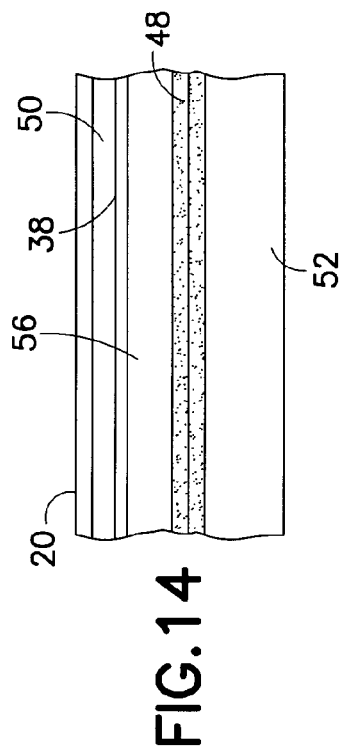
FIG. 14 is a drawing showing a magnified view of the structure encompassed by the dashed closed contour labeled with boldface numeral 14 in FIG. 13.
Figure 21:
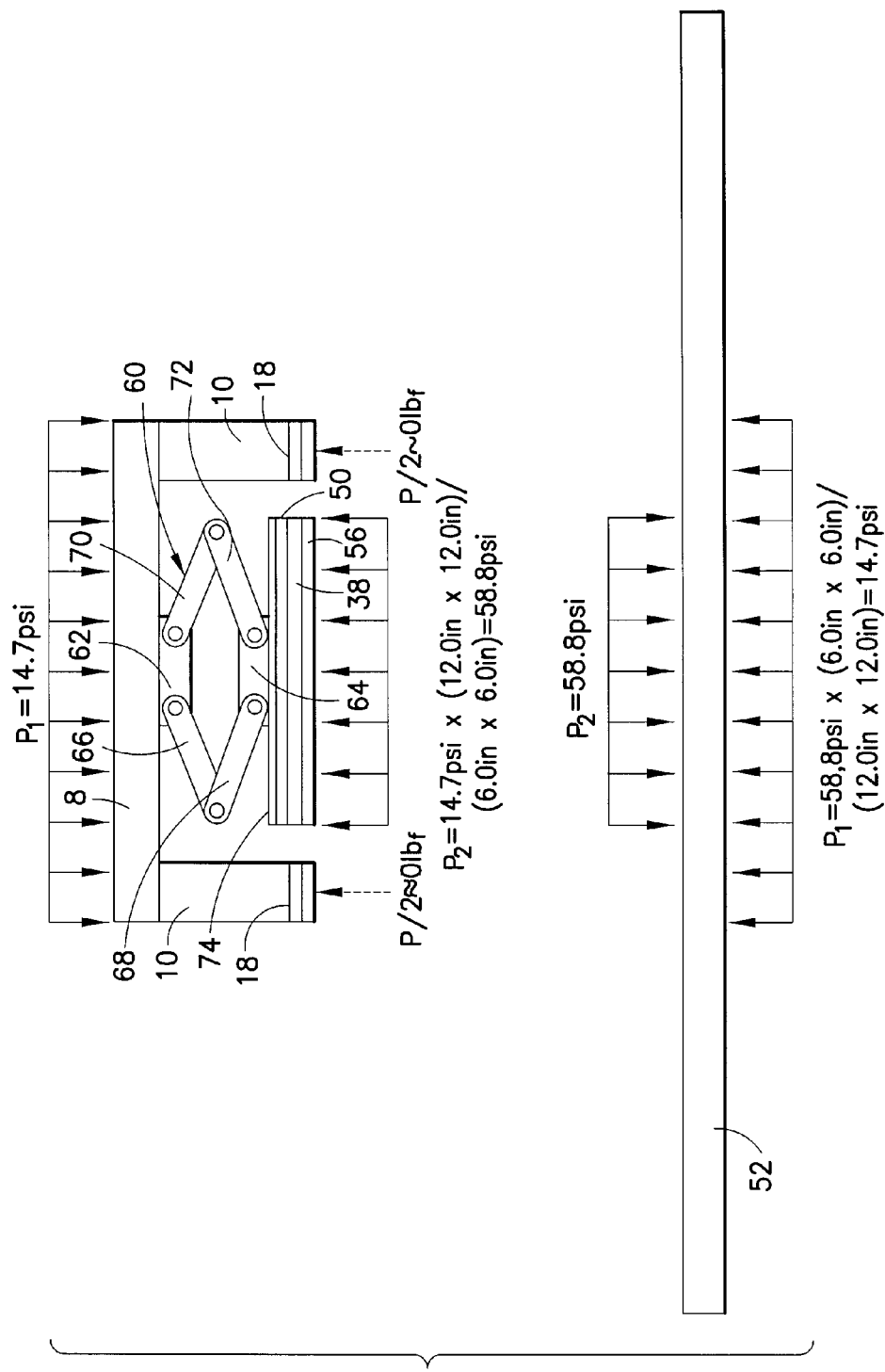
FIG. 21 is a free body diagram showing the estimated forces exerted on exemplary apparatus parts and components to be bonded in the state depicted in FIG. 19.

As bladder 20 inflates, the repair patch 56 is displaced downward and pressed against parent structure 52. As bladder 20 continues to apply pressure, the adhesive 48 applied on the respective confronting surfaces of parent structure 52 and repair patch 56 is pressed together for bondline cure as shown in FIG. 14, which is a magnified view of a portion of FIG. 13.

After parent structure 52 and repair patch 56 are pressed together with adhesive 48 therebetween, the adhesive is ready for cure. The cure cycle can be performed at room temperature or at some elevated temperature, depending on the requirements of the adhesive system. In accordance with the embodiment depicted in FIGS. 9-14, heating blanket 50 is used to raise the temperature of adhesive 48 to a level higher than room temperature. For adhesives that can be cured at room temperature, a heating blanket would not be needed.

In summary, to bond the repair patch 56 to the parent structure 52, the same process steps, as previously described, are performed in sequence, namely: (1) chamber 6 is evacuated, the vacuum pressure being maintained for a time sufficient to extract air and volatiles from the uncured adhesive; (2) after air and volatiles have been removed from the adhesive and while the vacuum pressure in chamber 6 is still being maintained, bladder 20 is inflated, causing repair patch 56 to be pressed against the parent structure 52 with adhesive 48 therebetween; and (3) while the vacuum pressure in chamber 6 and the additive pressure of inflated bladder 20 are maintained, heating blanket 50 is activated to heat adhesive 48 to its cure temperature. Following these steps, all of the equipment (excluding repair patch 56) is removed, leaving the repair patch 56 adhesively bonded to the parent structure 52. The surface of the repair area with repair patch can then be finished according to required specifications.

FIG. 15 is a free body diagram showing the estimated forces exerted for the exemplary case wherein the strongback support tooling 8 shown in FIG. 13 is a square 16 inches on each side and upper caul plate 38 is a square 12 inches on each side. In this example, the resulting estimated compaction pressure $P_2$=26.1 psi.

FIGS. 16A-16D show the sequence of operations for locating a component alignment template 54 and an evacuation chamber frame 2 in accordance with the embodiment depicted in FIG. 9.

In a first step (shown in FIG. 16A), the location where the adhesive system and repair patch will be placed on the parent structure 52 is sketched out and the component alignment template 54 is placed on parent structure 52 in alignment with the sketched circle.

In a second step (shown in FIG. 16B), adhesive 48 is placed on parent structure 52 inside component alignment template 54. The component alignment template 54 is used to control adhesive squeeze out and bondline thickness.

In a third step (shown in FIG. 16C), the evacuation chamber frame 2 is placed on parent structure 52 in a position dictated by the component alignment template 54, thus ensuring that the repair patch carried inside evacuation chamber frame 2 will be aligned with adhesive 48 which is bounded by component alignment template 54.

In a fourth step (shown in FIG. 16D), the repair patch will be stuck to the top of the evacuation chamber with double-sided adhesive tape, for example, and will be applied to the repair area after the evacuation process has been completed and the inner bladder has been pressurized, pressing the repair patch against the parent structure 52 with adhesive therebetween.

FIG. 17 is a sectional view of apparatus for void-free debulking of adhesive 48 applied to a parent structure 52 (e.g., an aircraft structure) and to a repair patch 56 to be bonded thereto in accordance with yet another embodiment of the invention. In a preferred embodiment, both the repair patch and parent structure are made of fiber-reinforced plastic material. The apparatus seen in FIG. 17 differs from that shown in FIG. 9 in that the upper heating blanket 50 is removably attached to a tooling pressure plate 74 of a mechanical pressure inducer 60 instead of to an inflatable bladder. Because the internal bladder is not present, the evacuation chamber will be the volume bounded by the evacuation chamber frame and the parent structure 52.

The mechanical pressure inducer 60 further comprises a member 62 which is affixed to the lower surface of the strongback support tool 8, a member 66 having one end pivotably coupled to one end of member 62 and another end pivotably coupled to one end of a member 68, and a member 70 having one end pivotably coupled to another end of member 62 and another end pivotably coupled to one end of a member 72. The other ends of members 68 and 72 are respectively pivotably coupled to opposite ends of a member 64 to which tooling pressure plate 74 is attached. The mechanical pressure inducer 60 is designed to alternately extend and retract in response to activation of a driving mechanism (not shown). The drive mechanism may, for example, be a lead screw of a screw jack, some other screw mechanism, a piston or a solenoid. FIG. 17 shows the mechanical pressure inducer 60 in a retracted state; FIG. 19 shows the mechanical pressure inducer 60 in an extended state.

As best seen in FIG. 18, the tooling pressure plate 74 supports a stack of components. An upper heating blanket 50 is removably attached (e.g., using double-sided adhesive tape) to the lower surface of tooling pressure plate 74; an upper caul plate 38 is removably attached (e.g., using double-sided adhesive tape) to the lower surface of upper heating blanket 50; and the repair patch 56 is removably attached (e.g., using double-sided adhesive tape) to the lower surface of upper caul plate 38. The bonding surface of the repair patch 56 is covered with adhesive 48.

FIG. 17 shows the apparatus after evacuation of chamber 6 and before activation of the mechanical pressure inducer 60. FIG. 19 shows the same apparatus after activation of the mechanical pressure inducer 60 while the vacuum pressure inside evacuation chamber 6 is still being maintained. In accordance with one preferred embodiment, the vacuum pressure inside evacuation chamber 6 stays constant at 14.7 psi throughout the entire process. This vacuum pressure is applied while parent structure 52 and repair patch 56 are separated as seen in FIG. 18 for a period of time sufficient to remove air and volatiles from the adhesive. When the desired degree of air/volatiles removal has been achieved, an additive pressure (preferably at least 5 psi) is induced by extending the mechanical pressure inducer 60, as shown in FIGS. 19 and 20. During this operation, the vacuum pressure inside chamber 6 is maintained.

As mechanical pressure inducer 60 is extended, the repair patch 56 is displaced downward and pressed against parent structure 52. As mechanical pressure inducer 60 continues to apply pressure, the adhesive 48 applied on the respective confronting surfaces of parent structure 52 and repair patch 56 is pressed together for bondline cure as shown in FIG. 20, which is a magnified view of a portion of FIG. 19.

After parent structure 52 and repair patch 56 are pressed together with adhesive 48 therebetween, the adhesive is ready for cure. The cure cycle can be performed at room temperature or at some elevated temperature, depending on the requirements of the adhesive system. In accordance with the embodiment depicted in FIGS. 17-20, heating blanket 50 is used to raise the temperature of adhesive 48 to a level higher than room temperature. For adhesives that can be cured at room temperature, a heating blanket would not be needed.

In accordance with further alternative embodiments, the linked members 62, 64, 66, 68, 70 and 72 shown in FIGS. 17 and 19 (which linked members limit lateral displacement of the mechanical pressure inducer) may be eliminated, while a screw mechanism, piston or solenoid is used to press the repair patch against the parent structure with adhesive therebetween. For example, in the case where a solenoid is used, a tooling pressure plate can be mounted to the end of the solenoid armature. Upon activation of the solenoid, the armature extends downward, causing the tooling pressure plate to press together the components to be bonded. In accordance with other embodiments, the solenoid can be replaced by a screw mechanism or a piston.

FIG. 22 is a free body diagram showing the estimated forces exerted for the exemplary case wherein the strongback support tooling 8 shown in FIG. 19 is a square 12 inches on each side and upper caul plate 38 is a square 6 inches on each side. In this example, the resulting estimated compaction pressure $P_2$=58.8 psi.

The processes disclosed above allow for both metallic and composite panel bonding and bonded joints to be fabricated with paste adhesives while minimizing the voids and/or porosity found in the cured bondline. These bonded joints could include test specimens and coupons, quick composite repairs, and externally bonded precured patches or uncured patches.

The embodiments disclosed above enable the evacuation of trapped air and/or volatiles that could produce a poor bondline once the panels or components (e.g., repair patch and aircraft structure) are bonded in place. The disclosed embodiments allow the adhesive to remain in an evacuated space through the pre-mating, mating, debulking and cure steps such that no entrapped air can encroach into the bondline. The processes disclosed herein can be employed on aircraft bonded structure, bonded test specimens or coupons, bonded precured patches, and/or bonded uncured patches.

Some of the embodiments disclosed herein enable void-free bonded joints in aircraft bonded structure, thus enabling increased reliability in fastenerless and unitized structural concepts. Aircraft with weight savings and cost savings are enabled when the bonded joints can be more reliably produced.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. An apparatus for use in forming a bonded joint, comprising:
a strongback support tool;
a spacer that is connected to one side of said strongback support tool and projects away from said strongback support tool, said spacer extending completely around a space adjacent to said one side of said strongback support tool;
an expandable apparatus comprising first and second members pivotably coupled to said strongback support tool, and third and fourth members respectively pivotably coupled to said first and second members, said expandable apparatus being disposed within said space when in a retracted state and when in an expanded state; and
a tooling pressure plate pivotably coupled to said third and fourth members, wherein said tooling pressure plate displaces away from said strongback support tool when said expandable apparatus changes state from said retracted state to said expanded state.

2. The apparatus as recited in claim 1, further comprising:
a heating blanket attached to said tooling pressure plate;
a caul plate attached to said heating blanket; and
a repair patch attached to said caul plate, said repair patch comprising fiber-reinforced plastic.

3. The apparatus as recited in claim 2, further comprising uncured adhesive covering a surface of said repair patch.

4. The apparatus as recited in claim 1, wherein said expandable apparatus further comprises one of the following: a lead screw or other screw mechanism, a piston or a solenoid for expanding said expandable apparatus.

5. The apparatus as recited in claim 1, wherein said spacer comprises at least one throughhole.

6. The apparatus as recited in claim 1, wherein said expandable apparatus further comprises a fifth member which is pivotably coupled to said third and fourth members and which is attached to said tooling pressure plate.

* * * * *